Figure 1:
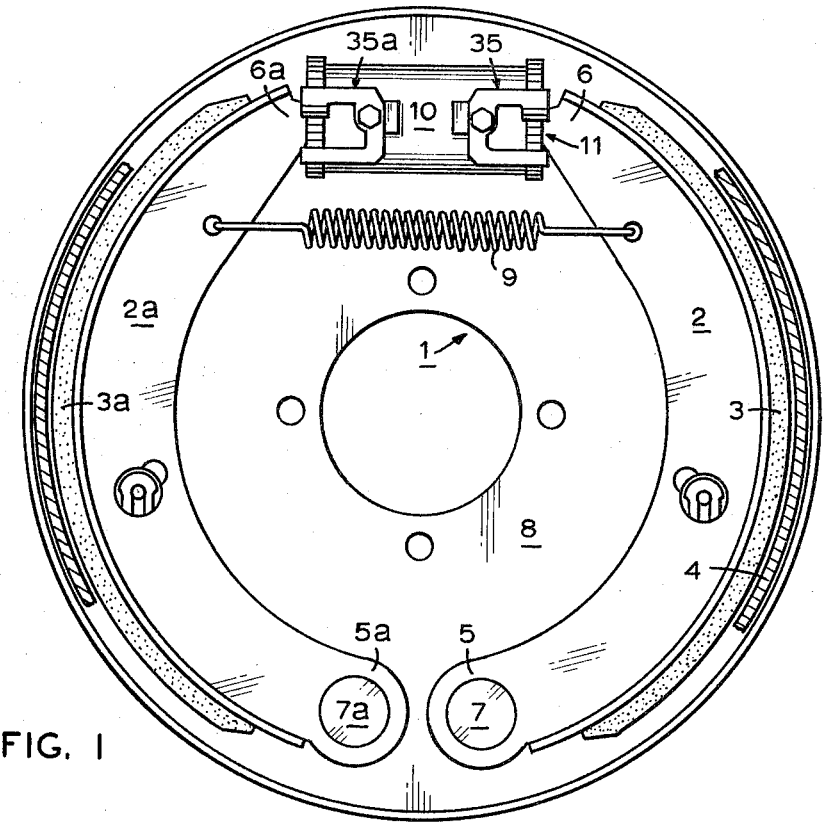

Aug. 9, 1966

S. W. CROISSANT ETAL 3,265,161

AUTOMATIC ADJUSTING MECHANISM

Filed July 27, 1964

3 Sheets-Sheet 1

INVENTORS
STANLEY W. CROISSANT
DONALD J. JASPER
BY
Joseph E. Papin

INVENTORS
STANLEY W. CROISSANT
DONALD J. JASPER
BY

United States Patent Office

3,265,161
Patented August 9, 1966

3,265,161
AUTOMATIC ADJUSTING MECHANISM
Stanley W. Croissant, Kirkwood, and Donald J. Jasper, Franklin, Mo., assignors to Wagner Electric Corporation, St. Louis, Mo., a corporation of Delaware
Filed July 27, 1964, Ser. No. 385,132
14 Claims. (Cl. 188—79.5)

This invention relates to automatic adjustors for friction members of a friction device and in particular to adjustors responsive to displacement and retractile movement of said friction members to controllably effect adjustment of said friction member displacement.

In the past automatic adjustment mechanisms utilized an extendable strut movably mounted in a friction device for concert displacement and retractile movement with a friction member, and the extension of said strut was controlled by a rotatably driven starwheel to define the retracted position of said friction member relative to a coacting member or drum. A spring loaded or resiliently urged adjustor was pivotally mounted on the friction device for driving engagement with the starwheel and included follower means which was urged by said spring load into following engagement with said starwheel to effect pivotal movement of said adjustor into driving engagement with said starwheel in response to the displacement and retractile movement of said friction member. One of the most objectionable or disadvantageous features of such automatic adjustors was the spring load force thereon which necessarily had to be overcome upon the displacement movement of the friction member to effect adjustment of the friction device by the adjustment mechanism; therefore, another objectionable feature associated with the aforementioned objectionable feature was also presented in that all of the force of the retractile movement of the friction member was not transmitted to the adjusting action.

The primary object of the present invention is to provide an automatic adjustment mechanism which overcomes the above-mentioned objectionable features.

Another object of the present invention is to provide an automatic adjustment mechanism utilizing an adjustor which is mechanically actuated.

Another object of the present invention is to provide an automatic adjustment mechanism which obviates the necessity of resilient actuating means therefor.

Another object of the present invention is to provide an automatic adjustment mechanism utilizing an adjustor which is actuated by the means which it drivingly adjusts.

Another object of the present invention is to provide an adjustor for driving an adjustable member defining the retracted position of a friction member, said adjustable member being concertly movable with said friction member and mechanically engaged with said adjustor to effect actuation thereof.

And still another object of the present invention is to provide a pivotally mounted adjustor for driving engagement with an adjustable member defining the retracted position of a friction member and concertly movable with said friction member, said adjustor including spaced abutments thereon respectively engageable with said adjustable member upon movement thereof to effect pivot actuating movement of said adjustor.

And yet another object of the present invention is to provide an adjustor for driving engagement with an adjustable member defining the retracted position of a friction member and concertly displaceable with said friction member, said adjustor including spaced abutments thereon respectively engageable with said adjustable means upon movement thereof to effect pivotal driving movement of said adjustor and one of said abutments being resiliently displaceable to obviate distortion of said adjustor in response to movement of said adjustable means in excess of a predetermined or desired amount.

And yet another object of the present invention is to provide an adjustor for a friction device of utmost simplicity embodying reliability and accuracy in performance.

These and other objects and advantages will become apparent hereinafter.

Briefly, the invention embodies adjustable means movably supported in a friction device and adjustably engaged for displacement movement with a friction member thereof, and means responsive to displacement and retractile movement of said friction member to controllably actuate said adjustable means and effect adjustment of the displacement of said friction member.

The invention also consists in the parts and arrangements and combination of parts hereinabove described and claimed.

In the drawings which illustrate embodiments of the invention.

Figure 2:
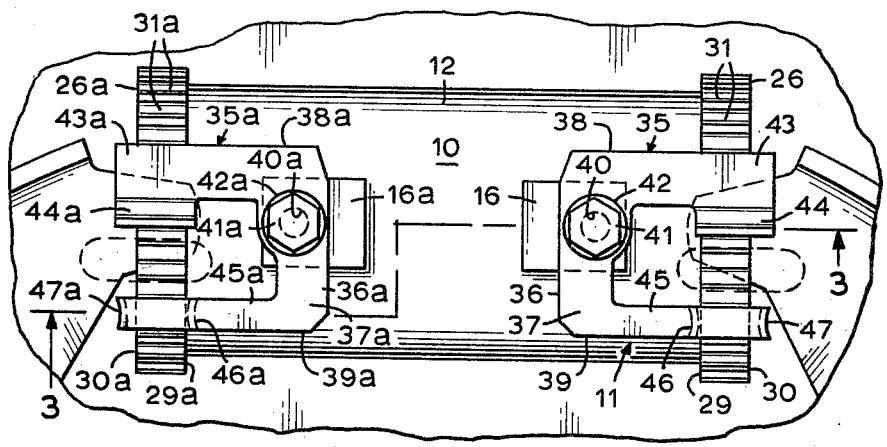
Figure 3:
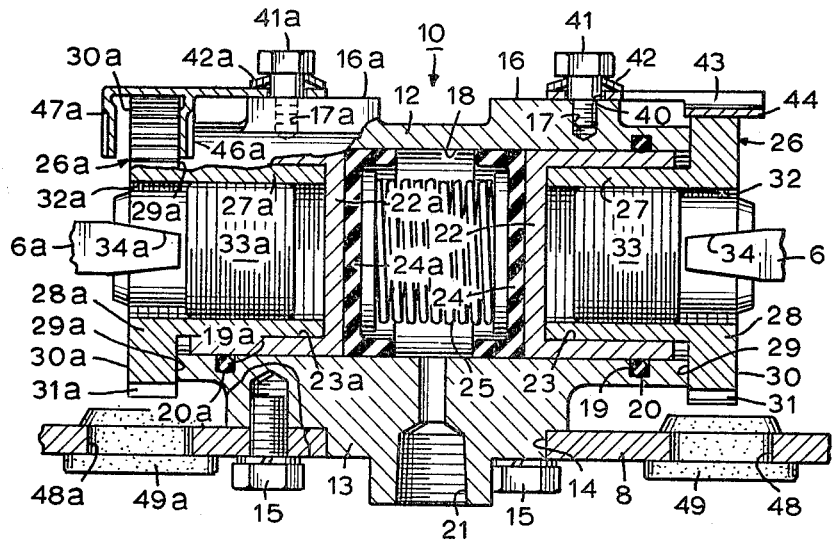
Figure 4:
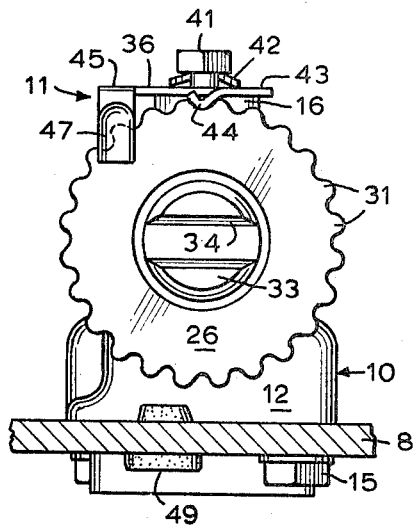
Figure 5:
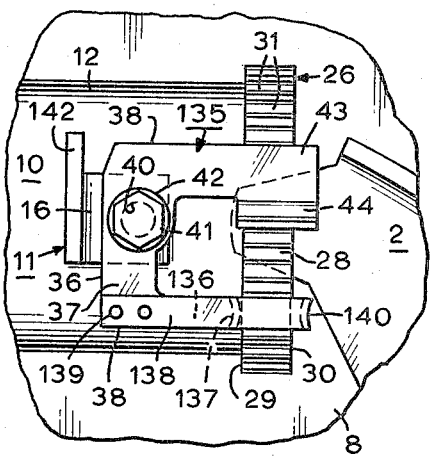
Figure 6:
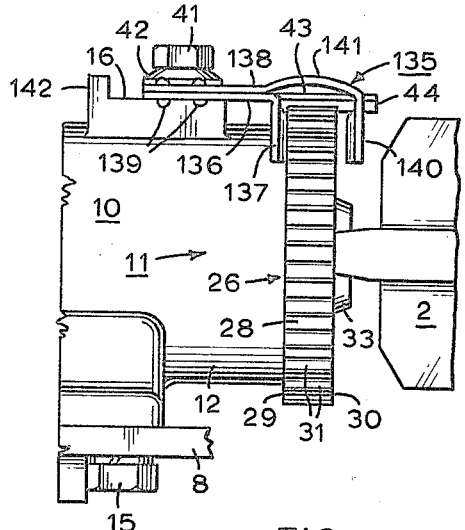
Figure 7:
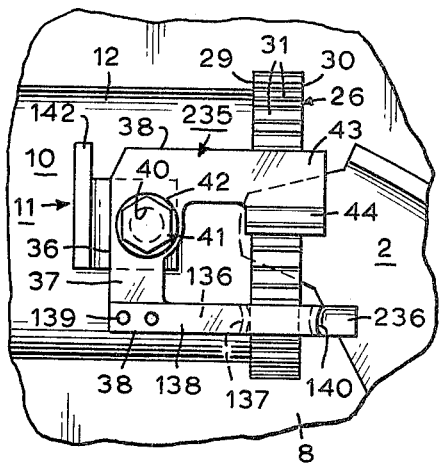
Figure 8:
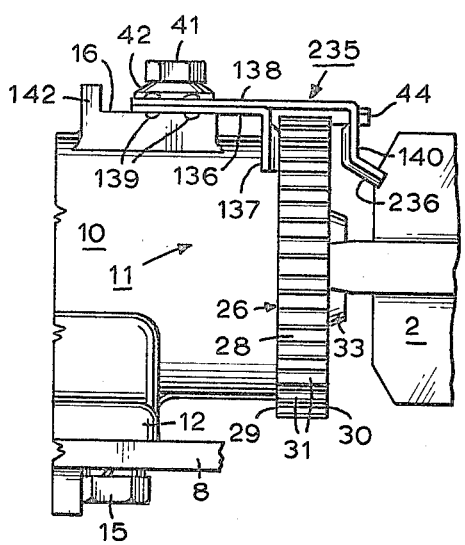

FIG. 1 is an elevational view of the friction device showing the preferred embodiment of the friction device therein, FIG. 2 is a greatly enlarged fragmentary view of the present invention as shown in FIG. 1, FIG. 3 is a partial sectional view of FIG. 2 taken along line 3—3, FIG. 4 is a right-hand view of the embodiment of FIG. 3, FIG. 5 is an enlarged fragmentary plan view illustrating another embodiment of the present invention shown positioned on the friction device of FIG. 1, FIG. 6 is a fragmentary front elevational view of the embodiment shown in FIG. 5, FIG. 7 is an enlarged fragmentary plan view illustrating yet another embodiment of the present invention shown positioned on the friction device of FIG. 1, and FIG. 8 is a fragmentary front elevational view of the embodiment shown in FIG. 7.

A friction device or brake assembly 1, FIG. 1, includes a pair of opposed radially displaceable friction members or brake shoes 2, 2a including friction material or linings 3, 3a for frictional engagement with a relatively rotatable friction producing element or drum member 4, said shoes having opposed sets of adjacent ends 5, 5a and 6, 6a. The adjacent or anchoring ends 5 5a of the brake shoes 2, 2a are supported by spaced anchor members 7, 7a provided on a backing plate or shield 8. A shoe return spring 9 is connected between the brake shoes 2, 2a normally urging the adjacent or displaceable ends 6, 6a of the brake shoes 2, 2a into engagement with an actuator motor or wheel cylinder 10 which includes automatic adjustment means, indicated generally at 11, for maintaining a predetermined clearance between the shoes 2, 2a and the drum 4.

Referring now to FIGS. 2–4 in particular, the wheel cylinder 10 includes a housing 12 having an integral mounting hub portion 13 which protrudes through an opening 14 provided in the backing plate 8, and a plurality of attaching means, such as studs 15, fixedly connect said wheel cylinder housing to said backing plate. A pair of spaced bearing surfaces 16, 16a are provided on the housing 12 adjacent to the opposed ends thereof, and threaded adjustor mounting apertures 17, 17a are provided in the housing 12 and extend through said bearing surfaces for pivot pin receiving purposes, to be discussed hereinafter. The housing 12 is provided with a bore 18 therethrough having grooves 19, 19a adjacent the open ends thereof in which are received wiper seals 20, 20a to prevent the entry of foreign material into said bore, and said bore is intersected near the mid-portion thereof by a pressure fluid port 21 which extends through the hub 13. Pistons or force receiving members 22, 22a having annular recesses 23, 23a therein are sealably engaged with the seals 20, 20a and are slidably received in the housing bore 18 to close the open ends thereof, and sealing cups 24, 24a are urged into sealing engagement between the bore 18 and pistons 22, 22a, respectively, by a spring 25. Rotatable adjustable members or starwheel members 26, 26a are provided with axial portions 27, 27a rotatably received in the piston recesses 23, 23a, and radially extending adjustment flanges or starwheels 28, 28a are integrally formed on the outer or free ends of said axial portions being positioned adjacent to the opposed ends of the housing 12. Opposed radially extending abutment shoulders or surfaces 29, 29a and 30, 30a are provided on the starwheel members 26, 26a, and axially extending grooves or notches 31, 31a are provided in the peripheral surfaces of the adjustment flanges 28, 28a between said abutment shoulders. Axial threaded bores 32, 32a are also provided through the adjustable members 26, 26a which cooperatively receive threaded extendable members or struts 33, 33a having shoe guide slots 34, 34a in the exterior ends thereof in which the adjacent ends 6, 6a of brake shoes 2, 2a are slidably received and retained against lateral displacement. The compressive force of the shoe return spring 9 normally urges the adjacent ends 6, 6a of the brake shoes 2, 2a into engagement with the shoe guide slots 34, 34a, which, in turn, serve to bias the shoulders 29, 29a of the starwheel members 26, 26a into abutment with the opposed ends of the wheel cylinder housing 12.

The present invention is primarily concerned with automatic adjustment of the brake shoes 2, 2a upon displacement movement thereof in excess of a predetermined amount relative to the drum 4 to compensate for wear of the shoe linings 3, 3a occasioned during frictional engagement with said drum, and for this purpose, the automatic adjusting means or mechanism 11 is provided. The automatic adjusting mechanism 11 includes driving members or adjustor levers, generally indicated at 35, 35a, having substantially C-shaped bodies or punchings 36, 36a formed from relatively thin sheet metal. The adjustor bodies 36, 36a include base portions or pivot arms 37, 37a having opposed free ends 38, 38a and 39, 39a and pivot apertures 40, 40a are provided in said pivot arms adjacent to the mid-portions thereof. The adjustor bodies 36, 36a are pivotally or rotatably mounted on the bearing surfaces 16, 16a of the wheel cylinder housing 12 by suitable means, such as studs or pivot pins 41, 41a, which extend through the pivot apertures 40, 40a of the pivot arms 37, 37a in pivotal bearing engagement therewith, and said pivot pins are cooperatively received against displacement in the threaded mounting apertures 17, 17a provided in said wheel cylinder housing. Spring or deflection washers 42, 42a are received on the pivot pins 41, 41a and are biased between said pivot pins and the pivot arms 37, 37a to normally urge the adjustor bodies 36, 36a into a normal operating plane in bearing engagement with the wheel cylinder housing bearing surfaces 16, 16a while also providing for limited deflection of said adjustor bodies away from said bearing surface and out of the normal operating plane. The adjustor bodies 36, 36a are provided with driving or adjusting arms 43, 43a which are integrally formed with said pivot arms 37, 37a adjacent to the free ends 38, 38a thereof, and depending tooth portions or detents 44, 44a are integrally formed on said adjusting arms normally in engagement with the peripheral notches 31, 31a on the starwheel members 26, 26a. Control or follower arms 45, 45a are integrally formed with the pivot arms 37, 37a adjacent to the free end portions 39, 39a thereof in spaced relation with the adjusting arms 43, 43a, and spaced depending follower or abutment flanges 46, 46a and 47, 47a are provided adjacent to the free ends of said control arms. The follower flanges 46, 46a and 47, 47a are provided for abutting engagement with the opposed radial abutment surfaces 29, 29a and 30, 30a of the starwheel members 26, 26a, respectively. The displacement distance or travel between the starwheel surfaces 30, 30a and the follower flanges 47, 47a must be great enough to obviate interference between the starwheel surfaces 29, 29a and follower flanges 46, 46a when said surfaces 30, 30a are drivingly engaged with said flanges 47, 47a to effect pivotal movement of the adjustor bodies 36, 36a; however, such displacement distance or travel must be predeterminably less than the displacement of the friction members 2, 2a into frictional engagement with the drum 4 in order to effect the driving engagement of said surfaces 30, 30a with said follower 47, 47a and the resulting pivotal movement of said adjustor bodies, as discussed in detail hereinafter. It is also contemplated as within the scope of the invention to construct or form the adjustor body members 36, 36a from spring-like material, such as spring steel, which inherently provides for limited deflection of the driving arms 43, 43a.

In order to illustrate the operation of the friction device 1 and the adjustment cycle of the adjustment mechanism 11, assume that the friction linings 3, 3a are sufficiently worn to warrant adjustment of the friction device and the component parts of said friction device and adjustment mechanism are positioned as above described. Fluid pressure transmitted to the bore 18 of the wheel cylinder 10 through the inlet passage 21 from a source of fluid pressure, such as a master cylinder or the like (not shown), acts on the effective area of the sealing cups 24, 24a to establish an actuating force. The actuating force serves to concertly move or displace the sealing cups 24, 24a, the pistons 22, 22a, the starwheel members 26, 26a, and the shoe guide members 33, 33a outwardly in the wheel cylinder bore 18 wherein the brake shoes 2, 2a are radially displaced from their normal retracted position against the compressive force of the return spring 9 to their displaced positions with the friction linings 3, 3a in frictional engagement with the rotating drum 4 to energize the friction device 1. Of course, such displacement movement of the brake shoes 2, 2a exceeds the aforementioned predetermined amount since it was assumed that the adjustment of the friction device 1 was necessary.

Since it was assumed that the friction linings 3, 3a were sufficiently worn to warrant adjustment of the friction device 1, the movement of the starwheel members 26, 26a in the displacement direction engages the radial abutment surfaces 30, 30a thereof with the flanges 47, 47a on the adjustor body control arms 45, 45a to provide pivotal movement of the adjustor bodies 36, 36a in opposite directions about the pivot pins 41, 41a. This pivotal movement of the adjustor bodies 36, 36a also serves to pivot the driving arms 43, 43a in opposite directions so that the detents 44, 44a ride up the surfaces of the starwheel peripheral notches 31, 31a wherein the adjustor bodies 36, 36a are slightly deflected out of their normal operating planes or away from the wheel cylinder bearing surfaces 16, 16a against the force of the spring washers 42, 42a, and the force of said spring washers subsequently moves or deflects said detents into driving engagement with the next successive starwheel notches while returning said adjustor bodies toward their normal operating planes.

When the friction device 1 is de-energized, the fluid pressure in the wheel cylinder bore 18 is exhausted eliminating the actuating force, and the compressive force of the shoe return spring 9 retractively moves the brake shoes 2, 2a toward their original retracted positions which, in turn, move the shoe guide members 33, 33a, the starwheel members 26, 26a, the pistons 22, 22a, and the sealing cups 24, 24a inwardly in the wheel cylinder bore 18 toward their original positions. This return or retractile movement of the starwheel members 26, 26a engages the radial abutment surfaces 29, 29a thereof with the flanges 46, 46a of the adjusting body control arms 45,

45a which serves to provide pivotal movement of the adjustor bodies 36, 36a in opposite directions about the pivot pins 41, 41a so as to return the adjustors 35, 35a to their original positions. This return pivotal movement of the adjustors 35, 35a serves to pivot the driving arms 43, 43a to their original positions, and since the detents 44, 44a are drivingly engaged with the next successive notches 31, 31a on the starwheel members 26, 26a, the return pivotal movement of said driving arms adjustably drives or rotates said starwheel members in the recesses 23, 23a of the pistons 22, 22a. Since concerted rotation of the shoe guide members 33, 33a with the starwheel members 26, 26a is prevented by the guiding engagement between the slots 34, 34a thereof and the adjacent brake shoe ends 6, 6a, the rotation of the starwheel members 26, 26a effects further threaded engagement between the threaded bores 32, 32a thereof and said guide members to adjustably displace or drive said guide members axially outwardly and adjust the retracted positions of the brake shoes 2, 2a. In this manner, the adjustable axial displacement of the guide members 33, 33a effectively moves or spreads the adjacent shoe ends 6, 6a apart to again reposition the friction linings 3, 3a on the brake shoes 2, 2a relative to the drum 4 and thereby adjust the friction device 1. Continued wear of the friction linings 3, 3a will, of course, occasion further adjustment of the friction device 1 by the automatic adjustment mechanism 11 in the same manner as previously described.

It should be noted that the adjustors 35, 35a of the automatic adjusting mechanism 11 are independently operable to effect adjustment of its associated brake shoe relative to the drum 4. In other words, if one of the friction linings 3, 3a is sufficiently worn to warrant adjustment of one of the brake shoes 2, 2a while the other of said friction linings is not sufficiently worn to warrant adjustment of the other of said brake shoes, the adjustor 35 or 35a associated with said one brake shoe having the worn lining will function as above described to effective adjustment; however, it is apparent that the adjustor associated with said other brake shoe on which the friction lining is not sufficiently worn to warrant adjustment will not be pivoted enough to drivingly engage the next successive starwheel notch to effect adjustment.

The friction device 1 may also be manually adjusted, and for this purpose, access apertures or openings 48, 48a, FIG. 3, are provided through the backing plate 8 substantially in alignment with the starwheels 26, 26a, and resilient closure members 49, 49a are normally removably secured in said access openings to prevent the entry of foreign material into the interior of said friction device. Removal of the resilient closure members 49, 49a permits the manual insertion of an adjusting tool, such as a screwdriver or the like (not shown), through the access openings 48, 48a into manual driving engagement with the notches 31, 31a of the starwheel members 26, 26a to rotate said starwheel members and manually effect adjustment of the brake shoes 2, 2a relative to the drum 4, as previously described. The resiliency of the spring washers 42, 42a permits deflection of the adjustors 35, 35a in order to accomplish the manual adjustment, and such resiliency causes the detents 44, 44a to re-engage the starwheel notches 31, 31a when the manual adjustment is completed.

Referring now to FIGS. 5 and 6, the adjusting mechanism 11 is shown having another adjustor 135 with substantially the same component parts and cooperating in substantially the same manner with the component parts of the friction device 1 as the previously described adjustor 35 with the following exceptions, and for the sake of simplicity only one adjustor is described hereinafter. The body 36 of the adjustor 135 is provided with a control or follower arm 136 which is integrally formed with the pivot arm 37 adjacent to the free end 38 thereof, and a depending follower flange 137 is provided on the free end of said follower arm for abutting engagement with the abutment surface 29 of the starwheel member 26. A resilient control or follower arm 138 has one end thereof fixedly connected to the pivot arm 37 adjacent the free end 38 thereof by suitable means, such as rivets 139, and a depending follower flange 140 is integrally provided on the other end of said follower arm 138 for abutting engagement with the abutment surface 30 of the starwheel member 26. To complete the description of the adjustor 135, the mid-portion of the follower arm 138 is bowed, as at 141, to effect resiliency in said follower arm and provide for deflection of the follower flange 140, and an abutment or stop 142 is provided on the wheel cylinder housing 12 for engagement with the adjustor 135 near the free end 38 of the pivot arm 36 to limit the pivotal movement of said adjustor.

The adjustor 135 functions in the same manner as the previously described adjustor 35 to effect adjustment of the friction device 1, and the resilient control arm 138 is provided to deflect and allow excessive movement of the starwheel member 26 such as would be encountered if the friction member 2 was not confined by the drum 4. In other words, the resiliency of the control arm permits excessive displacement of the brake shoe 2 such as might be encountered if the adjustment mechanism 11 was in the fully retracted position so that several adjusting cycles were required before the retracted position of said brake shoe was adjustably moved to a normal operating or adjusted position. This condition might be encountered if new linings were installed and the brake shoe 2 was not manually adjusted into the normal operating or adjusted retracted position with respect to the drum to effect a predetermined displacement therebetween. Under these conditions, displacement movement of the starwheel 26 and the brake shoe 2 toward their displaced positions engages the starwheel abutment surface 30 with the control arm flange 140 causing pivotal movement of the adjustor 135 in a counter-clockwise direction about the pin 41 into engagement with the stop 142 provided on the wheel cylinder housing 12, and such pivotal movement also moves the driving arm detent 44 toward a position in driving engagement with the next successive starwheel tooth 31, as previously described. With the adjustor 235 engaged with the stop 142, the successive displacement movement of the starwheel 26 effects deflection of the resilient portion 141 of the resilient control arm 138, and such resiliency of said control arm obviates the possibility of permanently distorting or fracturing the component parts of the adjustor 135 due to the excessive displacement conditions. Upon the return or retractile movement of the starwheel 26 and brake shoe 2, the starwheel abutment surface 29 is drivingly engaged with the follower flange 137 of the control arm 136 causing pivotal movement of the adjustor 135 in the clockwise direction about the pin 41 to its original position, and since the driving arm detent 44 is drivingly engaged with the next successive starwheel tooth 31, such clockwise rotation of the adjustor 135 serves to drivingly rotate the starwheel 26 to adjustably reposition the retracted position of the brake shoe 2 toward the cooperating drum 4. Of course, such adjustments of the brake shoe 2 will continue upon successive friction energization of the friction device 1 until the retracted position of the brake shoe 2 is adjustably moved within the desired predetermined operating range, and thereafter, the adjustor 135 will function in the same manner as the previously described adjustor 35 since the need for deflecting the resilient control arm 138 due to excessive displacement movement of the starwheel 26 and brake shoe 2 is obviated.

Referring now to FIGS. 7 and 8, the adjusting mechanism 11 is shown having another adjustor 235 with substantially the same component parts and cooperating in substantially the same manner with the component parts of the friction device 1 as the previously described adjustors 35 and 135 with the following exceptions.

The resilient or leaf spring-like control arm 138 of the adjustor 235 is provided with a guide flange 236 which is integrally formed with the depending follower flange 140 adjacent to the lower end thereof. When the adjustor 235 is pivoted into engagement with the stop 142, the resilient control arm 138 is deflected due to excessive displacement movement of the starwheel 26 and brake shoe 2, as previously described hereinabove, and the guide flange 236 is deflected with said resilient control arm to a guiding position in engagement with the periphery of the starwheel 26 or the notches 31 therein. Upon the retractile movement of the starwheel 26 and brake shoe 2, the guide flange 236 guides the follower flange 140 over the peripheral surface of said starwheel, and the resiliency of the control arm 138 thereafter snaps said follower flange back to its original position for abutment with the starwheel abutment surface 30. Farther retractile movement of the starwheel 26 and brake shoe 2 drivingly engages the starwheel abutment surface 29 with the follower flange 137 of the control arm 136 to effect pivotal adjusting rotation of the adjustor 235, as previously described.

It is apparent to those skilled in the art that the adjusting mechanism 11 or adjustors 35, 135 and 235 are not necessarily restricted or limited for use in the particular type or geometric configurations of the friction device 1 which is shown and described herein only for purposes of illustration. Further, the actuator motor or wheel cylinder 10 are shown and described in conjunction with the friction device 1 only for purposes of illustration, and it is also apparent to those skilled in the art that other means, such as cams, wedges and rollers or other like means well known to the art, may be employed to impart the actuating force to the brake shoes 2, 2a to energize the friction device.

From the foregoing, it is now apparent that novel automatic adjusting means for a friction device meeting the objects set out hereinbefore are provided and that changes or modifications as to the precise configurations, shapes or details of the constructions set forth in the disclosure by way of illustration may be made by those skilled in the art without departing from the spirit of the invention as defined by the claims which follow.

The embodiments of the invention in which an exclusive property or privilege is claimed are defined as follows:

1. In a friction device having a pair of relatively displaceable members adapted for energization into frictional engagement, adjustable means movably supported in said friction device and concertedly displaceable with one of said members upon the friction device energization and de-energization movement thereof, said adjustable means being rotatably driven relative to said one member to adjust the displacement thereof, a pair of abutment surfaces on said adjustable means, and driving means pivotally supported on said friction device for driving engagement with said adjustable means including other means respectively engageable with said adjustable means abutment surfaces upon the friction device energization and deenergization movement of said one member to effect pivotal movement of said driving means in opposite directions, said driving means being pivotally movable in one direction toward a position in driving engagement with said adjustable means and pivotally movable in the other direction to effect driving rotation of said adjustable means and adjust the displacement of said one member.

2. In the friction device according to claim 1 wherein said other means includes opposed flange means for respective engagement with said abutment surfaces.

3. In the friction device according to claim 1 wherein said other means includes a pair of follower arms having flange means thereon for respective engagement with said abutment surfaces.

4. In the friction device according to claim 3 wherein one of said follower arms includes a resilient portion yieldable in response to friction device energization movement in excess of a predetermined amount of said adjustable means with said one friction member to provide for movement of said one follower arm to a deflected position.

5. In the friction device according to claim 3 comprising a peripheral surface on said adjustable means between said abutment surfaces, one of said follower arms being resilient and yieldable to a deflected position in response to friction device energization movement in excess of a predetermined amount of said adjustable means with said one friction member, and means on said one follower arm for bearing engagement with said peripheral surface when said resilient member is in the deflected position.

6. In the friction device according to claim 4, comprising stop means for engagement with said driving means to limit pivotal movement thereof in the one direction when said one follower arm is deflected.

7. In a friction device having a pair of relatively displaceable members adapted for energization into frictional engagement, adjustable means movably supported in said friction device and concertedly displaceable with one of said members upon the friction device energization and de-energization movement thereof, said adjustable means being rotatively driven relative to said one member to adjust the displacement thereof, and adjustor means pivotally supported on said friction device including driving means for driving engagement with said adjustable means, follower means engageable with said adjustable means upon the friction device energization movement of said one member to pivot said adjustor means in one direction, said driving means being pivotally movable with said adjustor means in the one direction toward a position in driving engagement with said adjustable means, and other follower means engageable with said adjustable means upon the friction device de-energization movement of said one member to pivot said adjustor means in a direction opposite to the one direction, and said driving means being pivotally movable with said adjustor means in the opposite direction to effect driving rotation of said adjustable means and adjust the displacement of said one member.

8. In the friction device according to claim 7, comprising opposed abutment surfaces on said adjustable means, one abutment surface being moved into engagement with said first named follower means upon the friction device energization movement of said one member and the other abutment surface being moved into engagement with said other follower means upon the friction device de-energization movement of said one member.

9. In the friction device according to claim 7, wherein said first named follower means includes a resilient portion yieldable to a deflected position in response to friction device energization movement of said one member in excess of a predetermined amount.

10. In the friction device according to claim 9 comprising an abutment on said adjustor means for engagement with an adjacent portion of said friction device to limit pivotal movement of said adjustor means in one direction when said resilient portion is deflected.

11. In the friction device according to claim 7, comprising opposed abutment surfaces on said adjustable means for respective engagement with said first named and other follower means, a peripheral surface on said adjustable means between said abutment surfaces, and said first named follower means including a resilient portion yieldable toward a deflected position in response to movement of said adjustable means in the friction device energizing direction in excess of a predetermined amount, and guide means connected with said resilient portion for bearing engagement with said peripheral surface when said resilient portion is in the deflected position.

12. In a friction device having a pair of relatively displaceable members adapted for energization into frictional engagement, extendable adjustment means movably supported on said friction device and engaged for concerted displacement and retractile movement with one of said members to adjust the relative displacement between said members and compensate for member wear occasioned upon frictional engagement including actuating means rotatably driven relative to said one member to control the extension of said adjustment means and adjustably reposition said one member with respect to the other of said members thereby adjusting the relative displacement therebetween, and driving means pivotally supported on said friction device for driving engagement with said actuating means including spaced abutment means for abutting engagement with said actuating means upon displacement and retractile movement thereof with said one member and serving to translate the displacement and retractile movement thereof into pivotal movement of said driving means, said driving means being pivotally movable in response to the retractile movement of said one member into driving engagement with said actuating means to effect the adjusting rotation thereof and extend said adjustment means to adjustably reposition said one member with respect to said other member and thereby adjust the relative displacement therebetween.

13. In a friction device having a pair of relatively displaceable members adapted to energization into frictional engagement, extendable adjustment means engaged with one of said members for concerted displacement therewith upon energization of said members into frictional engagement and normally defining the retracted positions of said one member including driven means rotatable to extend said adjustment means and adjust the retracted position of said one member, adjustor means pivotally supported on said friction device, means on said adjustor means including spaced abutment means for respective engagement with said adjustment means, one of said abutment means being engageable with said adjustment means upon displacement movement thereof with said one member to effect pivotal movement of said adjustor means in one direction and the other of said abutment means being engageable with said adjustment means upon retractile movement thereof with said one member toward the retracted position to effect pivotal movement of said adjustor means in an opposite direction, and driving means on said adjustor means adapted for driving engagement with said driven means, said driving means being pivoted with said adjustor means in response to the retractile movement of said adjustment means into driving engagement with said driven means to effect adjusting rotation thereof and extend said adjustment means to adjust the retracted position of said one member.

14. In a friction device having a pair of relatively displaced members adapted for energization into frictional engagement, adjustment means movably supported on said friction device including an extendable strut engaged for concerted movement with one of said members upon energization of said members into frictional engagement and normally defining the retracted position of said one member, and driven means having an irregular peripheral portion and being rotatable to control the extension of said strut and adjust the retracted position of said one member, resilient means normally urging said one member toward the retracted position thereof into engagement with said strut, adjustor means pivotally supported on said friction device, a follower portion on said adjustor means including a pair of flange means for engagement with said driven means, one of said flange means being engaged by said driven means upon displacement movement of said adjustment means with said one member toward frictional engagement with the other of said member to effect pivotal movement of said adjustor means in one direction and the other of said flange means being engaged by said driven means upon retractile movement of said adjustment means with said one member toward the retracted position thereof to effect pivotal movement of said adjustor means in an opposite direction, a driving portion on said adjustor means including detent means adapted for driving engagement with the irregular peripheral portion of said driven means, and means translating displacement movement of said adjustment means and one member into displacement of said adjustor means in a direction substantially normal to said driven means peripheral portion to drivingly engage said detent means with a successive portion of said driven means peripheral portion, said driven means being thereafter drivingly rotated by said driving portion in response to the pivotal movement of said adjustor means in the opposite direction to extend said strut and adjust the retracted position of said one member.

References Cited by the Examiner
UNITED STATES PATENTS

| | | | |
|---|---|---|---|
| 3,169,610 | 2/1965 | Gold | 188—196 X |
| 3,209,866 | 10/1965 | Ullrich | 188—196 X |
| 3,216,534 | 11/1965 | Chouings et al. | 188—79.5 |

References Cited by the Applicant
UNITED STATES PATENTS

| | | |
|---|---|---|
| 2,389,618 | 11/1945 | Goepfrich. |
| 3,103,992 | 9/1963 | Dombeck. |

DUANE A. REGER, *Primary Examiner.*